Aug. 8, 1939.  A. C. CHRISTENSEN ET AL  2,168,898
SINGLE WHEEL MOLD CONVEYER
Filed April 18, 1938  2 Sheets-Sheet 1
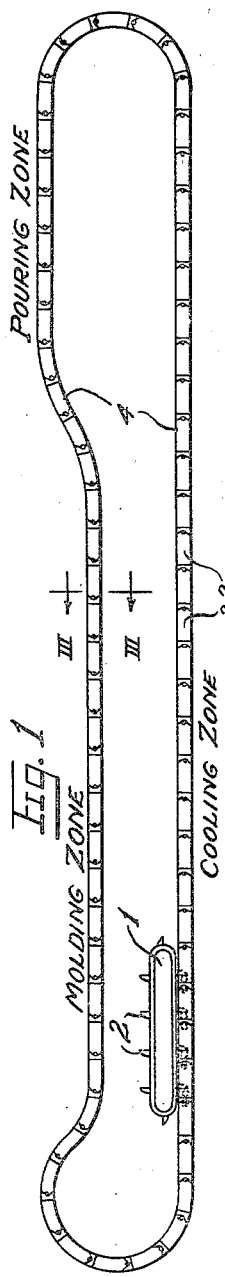
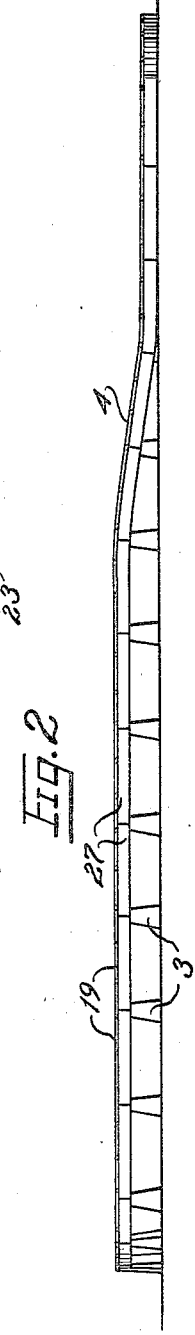
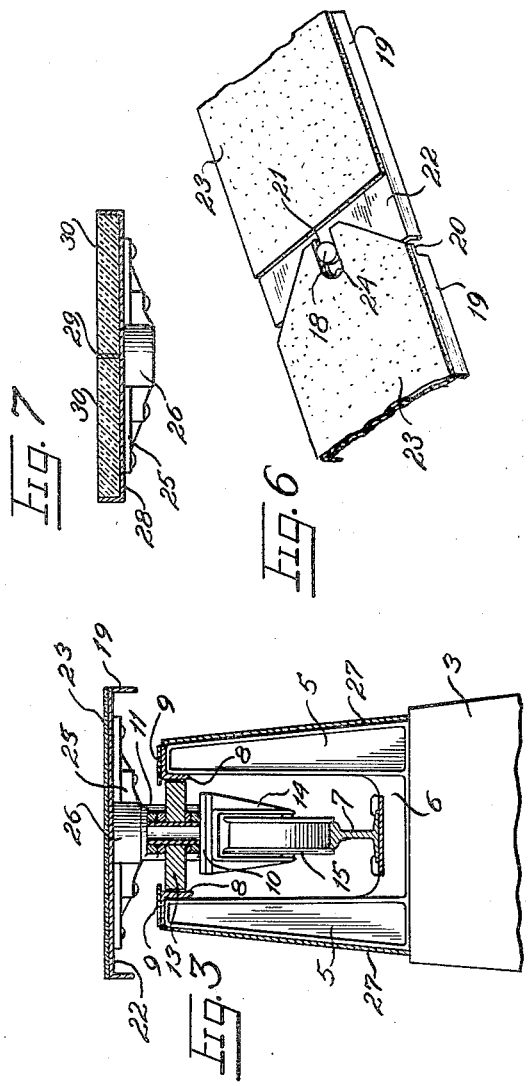
Inventors
ALFRED C. CHRISTENSEN
AXEL G. GRANATH

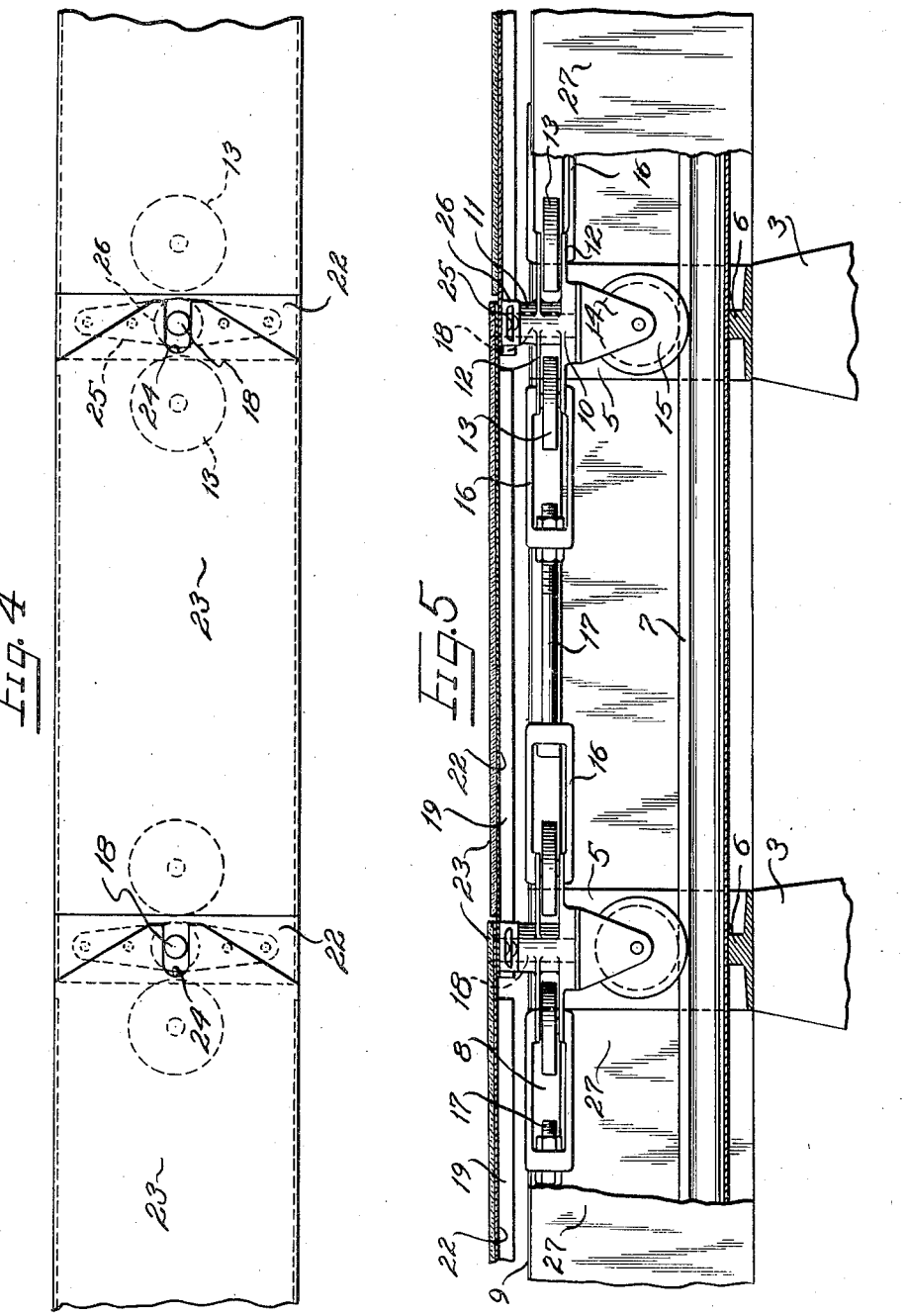

Patented Aug. 8, 1939

2,168,898

UNITED STATES PATENT OFFICE 2,168,898

SINGLE WHEEL MOLD CONVEYER

Alfred C. Christensen and Axel G. Granath, Chicago, Ill., assignors to Herbert S. Simpson, Chicago, Ill.

Application April 18, 1938, Serial No. 202,720

8 Claims. (Cl. 198—181)

Heretofore in the construction of mold conveying equipment, it has been the practice to provide mold conveyers for carrying the molds from the forming zone through the pouring zone and then through the cooling zone by means of continuous conveyer mechanisms wherein the mold trays are supported on four wheel trucks or carriages positioned to run on two rail tracks. Such types of mold conveyer mechanisms usually are so formed that when they are in operation the mold trays forming a part of the conveyers usually move with an uneven movement caused by irregularities in the double tracks and in the construction of the carriages, the four wheels of which in their movements over the tracks cause tipping, swaying, tilting and other irregular motions which are transmitted to the molds being carried. Since the molds are usually of the snap flask type which are formed on bottom boards, said molds are frequently vibrated or jarred to such an extent that the molds are cracked, broken and often entirely destroyed as they are being carried along in their course through the various zones.

To overcome the difficulties and losses resulting in the use of the old types of mold conveying mechanisms, the present invention has been developed to provide mold conveying mechanisms wherein the mold carrying trays are supported on trucks or carriages of a single wheel type equipped with guide rolls coacting with guide rails, so that when the single wheels run over a single rail track, the mold carrying trays are advanced with a smooth even movement so that the molds in their travel through the various zones are not subjected to shocks or strains from the conveyer mechanisms and are, therefore, smoothly carried through their course in practically perfect condition thereby eliminating annoying delays, breakage and needless expense.

It is an object of this invention to provide an improved type of mold conveying equipment wherein the conveyer is provided with single wheel trucks or carriages positioned to run on a single rail and supporting mold trays for conveying snap flask molds or the like with a smooth easy movement free from damaging or destroying shocks and strains.

It is also an object of this invention to provide a mold conveying equipment including a conveyer mechanism, having connected trucks or carriages supported on single wheels traveling on a single rail.

It is a further object of this invention to provide a mold conveying equipment including mold trays which are supported on single wheel carriages equipped with guide rolls tracking over guide rails, said carriages being connected one to another by adjustable takeup mechanisms.

It is an important object of this invention to provide an improved type of mold conveyer mechanism of a single wheel and guide roll type for traveling over a single rail and for carrying fold trays in a smooth even manner through forming, pouring and cooling zones without transmitting dangerous shocks, stresses or strains to the snap flask molds in their course of travel from the forming zone to the pouring zone and then through the cooling zone for eventual removal from the conveyer mechanism in substantially perfect form.

Other and further important objects of this invention will be apparent from the disclosures in the specification and the accompanying drawings.

The invention (in a preferred form) is illustrated in the drawings and hereinafter more fully described.

On the drawings:

Figure 1 is a top plan view, in schematic form, of a mold conveyer mechanism embodying the principles of this invention and having a continuous drive device associated therewith.

Figure 2 is a side elevation of the conveyer mechanism illustrated in Figure 1.

Figure 3 is an enlarged transverse detail section taken on line III—III of Figure 1.

Figure 4 is an enlarged fragmentary top plan view of a portion of the conveyer.

Figure 5 is an enlarged side elevation of the sectional portion of the conveyer illustrated in Figure 4, and having part of the side housing plates broken away and with the conveyer mold trays shown in section.

Figure 6 is an enlarged fragmentary perspective view of two overlapping end portions of the mold trays forming part of the conveyer mechanism.

Figure 7 is a transverse detail section of a modified form of a conveyer mold tray.

As shown on the drawings:

As illustrated in Figures 1 and 2, the reference numeral 1 indicates a conventional type of a continuous drive unit provided with driving teeth or projections 2 arranged at spaced intervals and adapted to be consecutively moved into engagement with portions of an endless conveyer mechanism.

The mold conveyer mechanism is of the continuous type as clearly illustrated in Figure 1 and is supported on the floor or on suitable supports with approximately two-thirds of the conveyer elevated above the floor and supported on concrete supports or blocks 3, as illustrated in Figure 2. Both sides of the conveyer incline downwardly as at 4 to permit one bight end of the conveyer to be positioned at a lower level than the other end. As shown in Figure 1, the continuous conveyer passes through a molding zone where the molds, of the snap flask type, are formed and placed upon the conveyer to be conducted through a pouring zone, where the molten metal is poured into the molds carried by the conveyer. After the molds have been filled, they are conducted around the bight portion at one end of the conveyer and are advanced upwardly from the pouring zone into a cooling zone. After the filled molds have been conducted through the cooling zone, they are advanced to a shake-out station where the molds are removed from the conveyer.

The mold conveying mechanism is supported upon the floor and upon the pedestals or supports 3 by means of a series of spaced metal supporting frames each of which comprises a pair of upwardly projecting uprights or arms 5 connected at their lower ends by means of integral transverse webs or cross pieces 6. Extending from one metal frame to another is a continuous single rail 7 which is securely supported upon the cross webs 6 between the upright arms 5 of the metal supporting frames as clearly illustrated in Figure 3.

Rigidly supported upon the upper end of the upright arms 5 of the supporting frames are angle iron guide rails 8. Seated upon the top flanges of the angle guide rails 8 are projecting retaining or stop plates 9 which serve as a means for maintaining the traveling conveyer in its proper path.

The conveyer mechanism proper is of a unitary or single wheel type for tracking on the single rail 7.

The single wheel conveyer mechanism includes a plurality of spaced trucks or carriages each of which comprises a cast yoke or body 10 formed with an integral upwardly projecting tubular hub or sleeve 11. Integrally formed on each side of the sleeve 11 are oppositely projecting pairs of bearing arms 12 between each pair of which a guide roll 13 is rotatably supported. The two guide rolls 13 of each of the conveyer carriages are positioned between the guide rails 8 to track thereon to insure a smooth advance of the conveyer. Secured rigidly to the bottom of each of the carriage yokes 10 is a bearing fork 14 between the arms of which a flanged single supporting wheel 15 is journaled. The single wheels 15, as clearly illustrated in Figures 3 and 5, run on the single rail 7. Pivotally connected to each pair of the bearing arms 12 is one end of a connecting link 16 whereby the opposite ends of each of the trucks or carriages are connected to the next trucks or carriages by means of take-up connecting bolts 17. The takeup units as clearly illustrated in Figure 5 project through openings in the outer end of the links 16 and each unit comprises a bolt provided with two adjustable nut members. Engaged in the upright sleeve 11 of each of the carriage yokes 10 is a king pin 18, the upper end of which projects slightly above the top end of the sleeve 11.

The linked single wheel carriages are adjustably and pivotally connected by means of the links 16 and the connecting bolts 17 and provide a suitable support for the mold carrying upper section of the conveyer mechanism. The mold carrying mechanism comprises a plurality of overlapping tray units each comprising an inverted metal channel section 19, one end of which is provided with an integral plate extension 20 which is tapered and is provided with an end notch 21. The tapered plate extension 20 forms an integral part of the top plate 22 of the tray channel section. The end of the channel section plate 22 opposite the tapered plate extension 20 is provided with an opening through which the upper end of a king pin 18 is adapted to project. As clearly illustrated in Figure 6, the king pin also projects into the notch 21 of the tapered end plate 20 of an adjacent mold carrying tray unit. Cemented or otherwise securely fastened upon the top of the tray plate 22 and the plate extension 20 is an asbestos composition slab or covering 23 which is cut off at one end to leave a portion of the tray plate 22 exposed to permit overlapping of the plate extension 20 of an adjacent tray unit. The asbestos slab or covering 23 which covers the plate extension 20 is also provided with a notch 24 which registers with the notch 21 to provide a suitable opening to permit the upper end of one of the king pins to project into the notched end of one tray unit where it overlaps a channel section of an adjacent tray unit. Rigidly secured transversely within one end of each of the mold tray units beneath the apertured portion of the tray plate 22 is a reinforcing yoke or bracket 25 having a passaged middle portion 26 through which the king pin projects.

For the purpose of keeping the single rail 7 and the conveyer mechanisms clean and free from the accumulation of foreign matter, protecting shields or plates 27 are secured to the opposite sides of the upright members 5 of the supporting frames thereby providing a protecting casing for the single rail and for the single wheel carriage unit forming part of the conveyer mechanism.

Figure 7 illustrates a detail transverse section taken through a modified form of mold tray comprising a metal channel section 28 provided with a longitudinal center partition 29 forming recesses in the top of the tray. The recesses are filled with an asbestos composition to form pads 30 upon which the molds are adapted to be supported. Each of the tray sections 28 has secured transversely beneath one end thereof a reinforcing yoke or bracket 25 formed with a passaged sleeve or middle section 26 into which the upper end of a king pin is adapted to project, when the mold tray is supported upon a single wheel carriage, similar to the arrangement illustrated in Figures 3 and 5.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A mold conveyer mechanism comprising in combination a continuous single rail track, and a conveyer unit supported thereon, said conveyer unit comprising a plurality of spaced carriage yokes, a supporting wheel on each of said carriage yokes tracking on the single rail track, guide rollers supported on each of said carriage yokes, link members connected with each of the carriage yokes, adjustable takeup connections between the links of adjacent carriage yokes, mold supports seated on the carriage yokes, and guides on opposite sides of the conveyer unit in cooperating relationship with the guide rollers.

2. A mold conveying mechanism including in combination, a continuous single rail, guides positioned on opposite sides thereof, a single wheel type conveyer supported on said single rail between the guides, said conveyer comprising a plurality of one-wheel carriage units, guide rollers supported on the carriage units in contact with the guides, links movably connected to each of the carriage units, adjustable connectors connecting the links of adjacent carriage units to form the continuous conveyer, a plurality of mold carriers, and transverse yoke members supported underneath one end of the mold carriers and interfitting with the carriage units.

3. A mold conveying mechanism comprising a plurality of supports, a single rail track mounted thereon, closure walls secured to the supports on opposite sides of the single rail track, and a conveyer between the closure walls and supported on said single rail track, said conveyer comprising a plurality of one-wheel carriage units, adjustable means connecting the carriage units one to another, king pin members supported on the carriage units, a plurality of mold carriers supported in overlapping relation with respect to one another, and reinforcing yokes secured to the mold carriers and engaged with the king pin members.

4. A mold conveyer unit comprising a plurality of carriage members, a single supporting wheel on each of the carriage members, a plurality of guide rollers carried by each of the carriage members, links connected to the carriage members, adjustable connectors connecting the links of adjacent carriage members, and mold carriers, each having one end connected with a carriage member and the other end overlapping an adjacent mold carrier.

5. In a mold conveying mechanism, a conveyer comprising a plurality of one-wheel carriages, guide rolls carried by the carriages, link members movably connected to the carriages, adjustable takeup bolts connecting the link members of adjacent carriages, a plurality of overlapping mold trays each having an opening in one end thereof and a notch in the opposite end, and king pin members carried by the carriages and projecting into the openings and notches of the mold trays.

6. In a mold conveying mechanism, a conveyer unit comprising a plurality of adjustably connected unitary wheel carriage units, king pin members projecting upwardly therefrom, and a plurality of mold trays, each having an opening in one end thereof for engagement over the king pin member of one carriage unit and having a notch in the opposite end thereof crotched around the king pin member of an adjacent carriage unit.

7. A mold conveyer mechanism comprising a single rail track, a conveyer supported on said track, and a caterpillar drive coacting with the conveyer to actuate the same, said conveyer comprising a plurality of one-wheel carriage units, adjustable means connecting the carriage units one to another, king pin members supported on the carriage units, a plurality of mold carriers supported in overlapping relation with respect to one another, and reinforcing yokes secured to the mold carriers and engaged with the king pin members.

8. In a mold conveying mechanism, a continuous conveyer comprising a plurality of one-wheel carriages, a continuous caterpillar type drive means coacting with the conveyer for driving the same, link members movably connected to the carriages, adjustable takeup bolts connecting the link members of adjacent carriages, a plurality of overlapping mold trays each having an opening in one end thereof and a notch in the opposite end, and king pin members carried by the carriages and projecting into the openings and notches of the mold trays.

ALFRED C. CHRISTENSEN.
AXEL G. GRANATH.